United States Patent Office 2,761,661
Patented Sept. 4, 1956

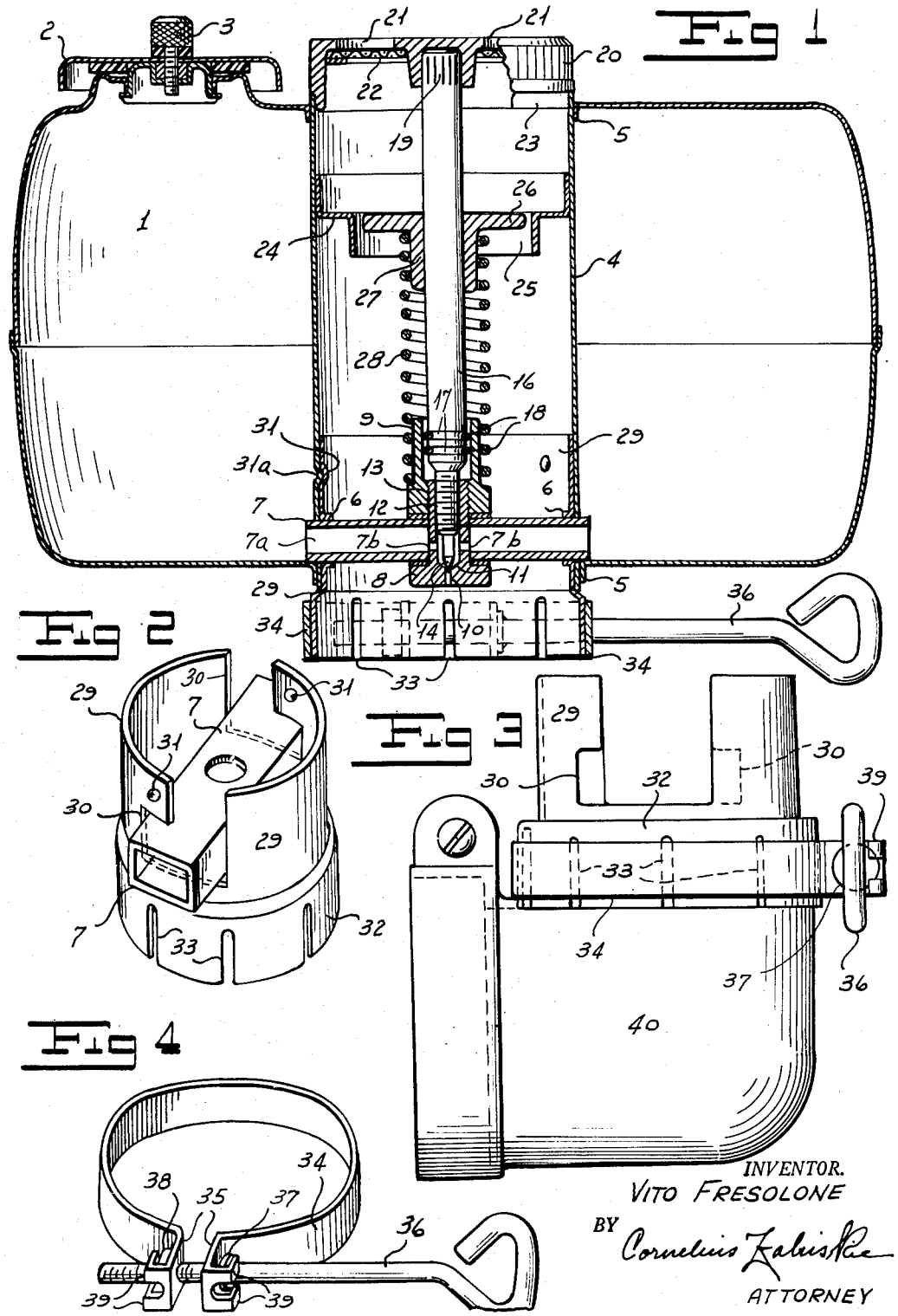

2,761,661

EMERGENCY FUEL SUPPLY DEVICE FOR INTERNAL-COMBUSTION ENGINES

Vito Fresolone, Union, N. J.

Application September 14, 1953, Serial No. 379,948

2 Claims. (Cl. 261—64)

This is a continuation-in-part of an application filed by me on October 5, 1951, Serial No. 249,881, on "Emergency Fuel Supply Device for Internal Combustion Engines."

The present invention is primarily useful in the event that an automobile or truck becomes inoperative, while in transit, because of an empty fuel tank, clogging of fuel supply lines, or carburetor failure. This device is adapted to be carried in the vehicle for use in such emergencies and many of these devices are also used by automobile repairmen in order to enable vehicles stuck along the highway to be driven to the service station for more safe and convenient trouble shooting and repair.

The primary object of this invention is to improve upon the device of my Reissue Patent No. 23,599, dated December 23, 1952 (original Patent No. 2,521,576, dated September 5, 1950), through material simplification of the device of said patent, a more economical assembly of the parts and a more efficient construction.

Among the novel aspects of this invention are improvements in valve arrangement, the utilization of a single adjustment for the valve and novel means for associating the device with the conventional carburetor of a motor vehicle.

Features of the invention, other than those adverted to, will be apparent from the hereinafter detailed description and appended claims, when read in conjunction with the accompanying drawing.

The accompanying drawings illustrate one practical embodiment of the invention, but the construction therein shown is to be understood as illustrative, only, and not as defining the limits of the invention.

Fig. 1 is a vertical section through a device embodying the present invention.

Fig. 2 is a perspective view showing an adapter embodying the present invention and the manner in which it is secured to the main portion of the device.

Fig. 3 is a side elevation of the adapter illustrated as connected to a carburetor or to a member interposed between the carburetor and the adapter.

Fig. 4 is a clamp for contracting the portion of the adapter into gripping relation with the carburetor or such interposed member.

In the drawing, 1 designates an auxiliary supply tank, conveniently made of two stamped sections, welded together midway of the height of the tank as shown. This tank is circular and relatively flat so that it may be received beneath the hood above the carburetor of an automobile or truck. The tank is adapted to contain gasoline, either with or without other liquids, adapted to be introduced through a filler opening normally closed by a filler cap 2. The cap is provided with a vent screw 3 to permit the flow of liquid from the tank through an appropriate outlet.

The top and bottom walls of the tank are centrally punched to provide vertically alined coaxial openings and extending through both openings and projecting below the bottom wall of the tank is a cylindrical air tube 4. The air tube openings in the top and bottom of the tank are preferably so formed as to provide flanges 5 which facilitate the welding or brazing of the tube 4 to the tank in liquid tight joints.

The side wall of the air tube 4 is provided at diametrically opposite points within and near the base of the tank with openings, shown as rectangular in form and about the margin of each opening is an inturned flange 6. Through the openings thus formed is thrust a tubular block 7 of rectangular cross section. The block 7, which constitutes the fuel tube, extends for the full diameter of the tube 4 and preferably projects outwardly slightly beyond the walls of the tube as shown best in Fig. 1 and is permanently welded, or otherwise secured in place, to form liquid tight joints between the walls of the tube and the block. The tubular block provides a straight through passage 7a, as will be apparent from Fig. 1.

The upper and lower walls of the block 7 are provided with vertically alined openings midway of the length of said block. These openings receive a fitting consisting of two parts 8 and 9. The part 8 is, in effect, a bolt and the part 9 a nut therefor. Through the head of the bolt is formed a fuel outlet passage 10 leading from a conical valve seat 11 and above this valve seat the shank of the bolt is counter-bored and internally tapped at 12, to receive the threaded portion 13 of a valve stem. This valve stem is provided terminally with a conical valve 14 adapted to cooperate with the valve seat 11. The nut 9 is screwed onto the bolt above the block 7, to clamp the block 7 between the head and nut, with interposed gaskets. In this way, the bolt and bolt assembly are rigidly supported on the block.

Above its threaded portion 13, the valve stem is enlarged, as at 16, and the enlarged portion is provided with annular grooves 17 containing O-rings 18 of packing material, such as synthetic rubber or some other appropriate packing substance which will not deteriorate in the presence of gasoline. The O-rings 18 form a tight seal between the surface of the valve stem and the inner unthreaded portion of the wall of the nut so that leakage at this point is precluded.

The valve stem is of sufficient length to extend above the upper end of the air tube 4 where it terminates in a knurled knob 19 to which is affixed an adjusting cap 20. This cap has vent openings 21 and fine mesh screen 22 is positioned within the cap 20 to underlie these openings. This screen permits the passage of air or gases in both directions through the openings but precludes the passage of extraneous matter such as dirt, grit, or the like. To guide the operations of the cap, its lower edge is preferably rabbeted at 23 to extend into the upper end of the air tube and form a bearing of sufficient length to permit adjustment of the valve within operative limits.

Within the air tube 4, and preferably near its upper end, a partition or shelf 24 is permanently affixed. This partition has a central air valve opening 25 for cooperation with an air valve 26. Valve 26 has a hub 27 mounted to freely slide up and down on the valve stem, but a spring 28 is interposed between valve 26 and the nut 9 and is of such strength as to balance the weight of the air valve and its hub and normally hold the air valve in the air valve opening 25. The air valve opening 25 is preferably in the form of a cylindrical passage, as shown, and accordingly the adjustment of the spring need not be critical. The spring is sufficiently light to respond to suction in the lower portion of the air tube and to permit the resulting differential pressures above and below the air valve 26 to depress said valve and permit air to flow downwardly through the air valve opening 25. Conversely, excessive pressures below the air valve will cause it to be raised above the opening 25 to permit the escape of such excessive pressures through the vent openings 21 of the cap 20.

I may, if desired, position a spring between the valve 25 and the hub of the cap 20, but I do not find this spring essential to the operation of the device.

The device which I have described is adapted to be mounted upon the inlet of a carburetor after the conventional air filter, normally associated with the latter, has been removed. To provide such a mounting there is associated with the lower end of the air tube an adapter of novel construction. It is of tubular form with its upper portion 29 of an external diameter to fit into and telescope within the lower end of the air tube 4. This upper portion is provided with oppositely positioned bayonet slots 30 of such size and so located that the portion 29 may be inserted into the tube 4 and rotated so that the bayonet slots 30 are engaged with the block 7, or equivalently with the flanges 6, to rigidly secure the adapter to the device. The adapter may be locked in this position by providing the portion 29 with one or more depressions 31 adapted to engage with correspondingly located projections 31a on the interior of the air tube 4 to preclude inadvertent retrograde rotation of the adapter. The projections 31a may be manually sprung free from the depressions when it is desired to change the adapter.

The lower portion 32 of the adapter is also cylindrical and is of a size to fit over the air inlet neck of the carburetor. This portion 32 is vertically slotted at 33 and is embraced by a clamping strap 34 which functions similarly to a hose clamp. The opposite ends of the strap are bent outwardly as shown at 35 in Fig. 4 and an eye bolt 36, having a shoulder 37, passes through perforations in the parts 35 and threads into a nut 38. Lugs 39 formed on the ends of the parts 35 straddles the shoulder 37 and nut 38 to hold them in position. By manipulation of the eye bolt, the clamp may be tightened about the portion 32 of the adapter, so that it is clamped firmly to the neck of the carburetor for the purpose of mounting the device of this invention rigidly in position on such carburetor. The device, however, may be readily removed by simply unscrewing the eye bolt. Since different carburetors have air inlet necks of different sizes, appropriate adapters are provided to fit carburetors of corresponding size.

In some modern carburetors the air inlet is on the side and in such cases an intermediate connector 40, shown in Fig. 3, may be interposed between the adapter and the carburetor.

When, for any of the reasons hereinbefore described, it is desired to use the device of this invention, the conventional air filter is removed, the adapter is brought into engagement with the air inlet neck of the carburetor or with a connector 40 and clamped in place to mount the device on the carburetor. While these operations are proceeding, the fuel valve 14 is engaged with its valve seat 11 so that the liquids are contained within the auxiliary tank 1 without leakage or undersirable discharge. When the device is firmly in place, the cap 20 on the valve stem is rotated to back off the fuel valve 14 sufficiently to permit fuel to be fed from the interior of the tank, through the passage 7a to and through openings 7b in the side of the bolt and past the valve seat 11 to and through the outlet passage 10 into the interior of the tube and adapter.

After valve 14 has been opened, the ignition is turned on, the operator steps on the starter and the engine is thereby "turned over," resulting in suction in the inlet manifold. This suction is conveyed through the conventional carburetor to the air inlet tube 4 and produces a sub-atmospheric pressure below the air valve 26. As soon as this occurs, atmospheric air pressure exerted upon the upper surface of the valve forces the air valve 26 downwardly to a point below the air inlet opening 25 and air then sweeps through the air tube 4 and passes through the conventional engine carburetor to the inlet manifold and thence to the engine cylinders. As this air passes through the tube 4, it picks up the fuel entering the air flow through the open valve seat, breaks it up, is carbureted thereby, and carries it through the carburetor, through the intake manifold and thence to the engine cylinders and, when sufficient fuel is being fed, the engine will start.

As soon as the engine starts, the cap 20 on the fuel valve stem should be adjusted to give the proper mixture. When the valve is thus adjusted, it will operate indefinitely on this adjustment or until the tank 1 is empty. The tank may be refilled for further operations of the same kind if desired, but ordinarily the emergency will have passed or the particular operation which it is desired to have the device carry out has been fulfilled. The device may then be removed and the air filter replaced. If the device has been used as an emergency measure until convenient repair can and has been made, the device is then no longer necessary for the engine will then operate with its regular carburetor.

Should backfire occur while the device is in use, it can do no harm, for the air valve 26 will merely rise above the opening 25 and permit excessive pressure below this valve to harmlessly escape through the openings 21. Under normal conditions, however, the valve 26 will occupy a position substantially within the air valve opening 25 where it is ready to move in either an upward or downward direction as required and wherein this downward movement, against the pressure of the spring 28, will be sufficient to allow of a proper mixture of air with the fuel fed through the fuel valve seat 11.

The herein described form of the invention has proven to be highly efficient in the carrying out of its intended functions. It may be attached and detached with ease and expedition and is absolutely safe to use. It overcomes the difficulties and disadvantages which have been prevalent in prior devices of others suggested for emergency purposes and meets a long felt want in its field of use.

This invention should not be confused with the ordinary conventional carburetors with which internal combustion engines of motor cars, trucks, etc., are universally regularly provided. On the contrary, it is an additional device, separate and apart from the conventional carburetor, and is used in conjunction with the latter only when the conventional carburetor fails to perform its intended functions or when it is desired to augment the normal functions of a carburetor in the carbureting of fuels by the introduction of an additional substance or solution over and above that normally delivered through the conventional carburetor.

This invention has proved of great worth and utility, particularly when carried as an accessory to be applied in the event of failure of the induction system for lack of fuel in the main tank, clogging of feed lines, or otherwise. In such cases, the conventional carburetor is utterly useless in the absence of the emergency device forming the subject matter of this invention which, when mounted as hereinbefore described, will immediately render the engine operative, irrespective of the condition of the associated conventional carburetor or fuel lines.

The foregoing detailed description sets forth the invention in its preferred practical form but the invention is to be understood as fully commensurate with the appended claims.

Having thus fully described the invention, what I claim as new and desire to secure by Letters Patent is:

1. An emergency fuel supply device for attachment to the conventional carburetor of an internal combustion engine comprising: a fuel supply tank wholly separate and independent of such carburetor, an air tube extending vertically through the tank and the lower end of which is adapted to be secured to an air inlet of the conventional carburetor, a fuel tube extending transversely across the interior of the air tube with its opposite ends open to the interior of the fuel tank, said fuel tube being provided intermediate its ends with vertically alined openings, a headed bolt extending upwardly through said openings with the head of the bolt locked against the under side of the fuel tube by a nut screwed onto the bolt and engaging with the upper side of the fuel tube, said bolt having an interior passage therethrough with a valve seat near its lower end and threaded above the valve seat and the shank of said bolt having openings leading from the interior passage of the bolt to the interior of the fuel tube and through which fuel may be fed from the tank to the valve seat, a fuel valve cooperating with said seat and provided with a stem having threaded engagement with the interior passage of the bolt above the valve seat and extending upwardly and having at its upper end an adjusting member to regulate the valve with respect to said valve seat, a stationary partition across the upper portion of the interior of the valve tube provided with an air valve opening, an air valve slidable on the valve stem and of a size to permit it to freely pass through the air valve opening, and resilient means for normally maintaining the air valve in the air valve opening but permitting the air valve to range above and below said air valve opening according to the differential pressures of engine operation.

2. An emergency fuel supply device according to claim 1, wherein a portion of the interior of the nut is cylindrical and unthreaded, and packing between the valve stem and the unthreaded portion of the nut to preclude fuel leakage between the valve stem and nut.

References Cited in the file of this patent

UNITED STATES PATENTS

| Number | Name | Date |
|---|---|---|
| 666,623 | Gebhart | Jan. 22, 1901 |
| 997,417 | Rothe | July 11, 1911 |
| 1,020,615 | Magnuson | Mar. 19, 1912 |
| 1,779,709 | Melkman | Oct. 28, 1930 |
| 1,809,387 | Melkman | June 9, 1931 |
| 2,389,685 | Pike | Nov. 27, 1945 |
| 2,449,659 | Lane | Sept. 21, 1948 |
| 2,449,735 | Wyss | Sept. 21, 1948 |
| 2,485,701 | Cristofani et al. | Oct. 25, 1949 |
| 2,512,225 | Derner | June 20, 1950 |